UNITED STATES PATENT OFFICE.

FRED BEDFORD AND CHARLES ED. WILLIAMS, OF SLEAFORD, ENGLAND, ASSIGNORS TO CEDFORD GAS PROCESS COMPANY LIMITED, OF LONDON, ENGLAND.

CATALYTIC SYNTHESIS OF METHANE.

989,755. Specification of Letters Patent. Patented Apr. 18, 1911.

No Drawing. Original application filed February 25, 1910, Serial No. 546,016. Divided and this application filed December 19, 1910. Serial No. 598,228.

*To all whom it may concern:*

Be it known that we, FRED BEDFORD and CHARLES EDWARD WILLIAMS, subjects of the King of Great Britain and Ireland, and residents of Sleaford, in the county of Lincoln, England, have invented certain new and useful Improvements in and Connected with the Catalytic Synthesis of Methane, of which the following is a specification.

This invention relates to an improved process for the catalytic synthesis of methane or a mixture of methane with other gases and is the complement of the invention set out in specification to our co-pending application Serial No. 546,016.

The value of ordinary coal gas is due to the large percentage of methane contained therein, and attempts have been made to produce methane synthetically from carbon oxids by the action of hydrogen in the presence of finely divided nickel, the function of the latter being simply catalytic. The reactions which take place may be represented by the equations:—

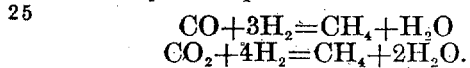

This catalytic reaction proceeds smoothly provided the reacting gases are pure, and provided also that hydrogen is present in sufficient quantity as demanded by the above equations. If, however, the reacting gases contain certain substances — hereinafter termed impurities—such as sulfureted hydrogen, carbon disulfid, mercaptan and sulfur compounds in general, even if only in very minute quantities, the nickel very soon loses its activity. In order, therefore, to preserve the activity of the nickel, it is essential that the impurities invariably present in commercial gases be carefully removed before the latter are allowed to come in contact with the catalytic nickel. Various processes have been proposed for the removal of the impurities. Again all commercial gases obtained by gasifying coal and containing hydrogen and carbon monoxid are deficient in hydrogen. Various methods have been proposed for the removal of the sulfur impurities, and for obtaining carbon monoxid and hydrogen in the proper relative quantities, either by varying the mode of manufacture of the gases or by adding hydrogen. Some of these methods have depended on the cooling of the gases to a degree sufficient only to liquefy them with a view to the separation of certain of the constituents. But none of these processes have been so far commercially successful.

The object of this invention is to provide a process by which the sulfur impurities may be effectually removed and at the same time the cheapest of the commercial gases of the type of Mond gas and Duff gas and the like may be commercially treated for the production of methane, without there being any need to modify their process of manufacture.

In carrying out this process the mixture of gases (which should be first freed from carbon dioxid) is cooled to the degree necessary in order to get the sulfur impurities into a solid form having little or no vapor tension, the hydrogen passing off as a gas and being collected while the carbon monoxid, nitrogen, and methane will be liquid or solid. On allowing this latter mixture to evaporate carbon monoxid and nitrogen distil off first and are effectually separated from the sulfur impurities. After this distillation process a certain quantity of the carbon monoxid obtained is mixed with the hydrogen so that the hydrogen and carbon monoxid are in the required proportions and this mixture is passed over nickel in the known manner. There should always be an excess of hydrogen over the theoretical quantity in order to prevent local heating of the metal. The amount of this excess depends on various circumstances, such as the speed at which the gaseous mixture is passed over the metal, and if nitrogen is present this acts as a diluent and assists in preventing local heating, and a smaller excess of hydrogen may be used than would otherwise be necessary.

To illustrate one mode of carrying out the invention, suppose it be required to prepare methane synthetically from a Mond gas of the following approximate composition:—hydrogen 28 per cent., carbon monoxid 11 per cent., carbon dioxid 16 per cent., methane 2 per cent., nitrogen 43 per cent. The carbon dioxid is first removed in any known manner, for example, by absorption in a solution of sodium carbonate, such removal being desirable to prevent the clogging of the apparatus by the carbon dioxid. The residual mixture is passed through a cooling apparatus adapted to cool it to a temperature of about —190° C. A cooling apparatus of the well-known type used in the fractionable abstraction method of obtaining oxygen from the air may be employed for this purpose. After this cooling process the hydrogen passes off as a gas carrying with it small quantities only of carbon monoxid and nitrogen but leaving behind it the bulk of these gases with the methane and all the sulfur impurities in the solid form that were present in the commercial gas. The hydrogen may be collected in a suitable tank or holder while the mixture which is left behind in the cooling apparatus is evaporated so that the carbon monoxid and nitrogen distil off first, and these may be separated by known means, for example, by absorption of the carbon monoxid by means of cuprous chlorid solution from which carbon monoxid may be again obtained by evaporation. In this way the purified gas is separated into its constituents and a certain quantity of the carbon monoxid thus obtained is mixed with the hydrogen so that these two gases are present in the required quantities, and the mixture, entirely freed from the impurities which were present in the commercial gas, is passed over heated and finely divided nickel in order that it may be converted into methane. It is to be noted that nitrogen is not an impurity in the sense hereinbefore referred to, and it is immaterial, so far as the catalytic activity of the nickel is concerned, whether it is present or not during the catalytic reaction.

Having now described our invention what we claim as new and desire to secure by Letters Patent is:—

1. A process for the catalytic synthesis of methane from a commercial gas containing hydrogen and carbon monoxid comprising cooling the commercial gas to such a degree that the impurities separate out in the solid form possessing little or no vapor tension, separating the purified gas into its constituents, mixing the carbon monoxid thus obtained with hydrogen, and passing the mixture into contact with a heated catalytic substance for the purpose set forth.

2. A process for the catalytic synthesis of methane from a commercial gas containing hydrogen and carbon monoxid comprising cooling the commercial gas to such a degree that the impurities separate out in the solid form possessing little or no vapor tension, separating the purified gas into its constituents, mixing the carbon monoxid thus obtained with hydrogen in the required quantity and passing the mixture into contact with a heated catalytic substance for the purpose set forth.

In testimony whereof, we affix our signatures in presence of two witnesses.

FRED BEDFORD.
CHAS. ED. WILLIAMS.

Witnesses:
W. Warren Triggs,
P. A. Outhwaite.